(12) United States Patent
Wells et al.

(10) Patent No.: US 7,385,503 B1
(45) Date of Patent: Jun. 10, 2008

(54) SELF POWERED SON DEVICE NETWORK

(75) Inventors: Christopher Ashley Wells, Eden Prairie, MN (US); Robert J. Karschnia, Chaska, MN (US)

(73) Assignee: Rosemount, Inc., Eden Prairie, MN (US)

( * ) Notice: Subject to any disclaimer, the term of this patent is extended or adjusted under 35 U.S.C. 154(b) by 0 days.

(21) Appl. No.: 11/498,831

(22) Filed: Aug. 3, 2006

(51) Int. Cl.
*G08B 1/08* (2006.01)
*G08B 23/00* (2006.01)
*G08C 19/16* (2006.01)
*G05B 11/01* (2006.01)
*G06F 15/173* (2006.01)

(52) U.S. Cl. ............... 340/539.26; 340/854.3; 340/870.01; 700/22; 709/239; 709/243; 709/244

(58) Field of Classification Search ........... 340/539.26, 340/854.3, 870.01, 870.02; 370/255, 310, 370/389; 455/96, 423; 700/19, 22; 709/238, 709/239, 243, 244
See application file for complete search history.

(56) References Cited

U.S. PATENT DOCUMENTS

| | | | | |
|---|---|---|---|---|
| 4,783,799 A | * | 11/1988 | Maass | 380/43 |
| 5,495,709 A | * | 3/1996 | Frutschi | 60/39.55 |
| 5,504,717 A | | 4/1996 | Sharkey et al. | |
| 6,100,600 A | * | 8/2000 | Pflanz | 290/54 |
| 6,155,292 A | | 12/2000 | Kruata | |
| 6,657,589 B2 | * | 12/2003 | Wang et al. | 342/383 |
| 6,744,740 B2 | * | 6/2004 | Chen | 370/255 |
| 7,233,745 B2 | * | 6/2007 | Loechner | 398/128 |
| 2003/0137415 A1 | | 7/2003 | Thomson | |
| 2003/0234730 A1 | | 12/2003 | Arms et al. | |
| 2004/0139110 A1 | | 7/2004 | LaMarca et al. | |
| 2004/0257241 A1 | * | 12/2004 | Menger | 340/854.3 |
| 2005/0206530 A1 | * | 9/2005 | Cumming et al. | 340/870.02 |
| 2005/0275532 A1 | | 12/2005 | Ferri et al. | |
| 2006/0029061 A1 | | 2/2006 | Pister et al. | |
| 2006/0046664 A1 | * | 3/2006 | Paradiso et al. | 455/96 |
| 2006/0063522 A1 | * | 3/2006 | McFarland | 455/423 |
| 2006/0077918 A1 | * | 4/2006 | Mao et al. | 370/310 |
| 2006/0089757 A1 | * | 4/2006 | Yoshimura et al. | 701/2 |
| 2007/0101705 A1 | * | 5/2007 | Knitt | 60/295 |
| 2007/0169469 A1 | * | 7/2007 | Knitt | 60/295 |

OTHER PUBLICATIONS

Vijay Raghunathan et al., "Design Considerations for Solar Energy Harvesting Wireless Embedded Systems", Fourth International Symposium on Information Processing in Sensor Networks, Apr. 15, 2005, pp. 457-462.*

(Continued)

*Primary Examiner*—Crystal Barnes-Bullock
(74) *Attorney, Agent, or Firm*—Kinney & Lange, P.A.

(57) ABSTRACT

A network includes a plurality of wirelessly interconnected self-organizing network (SON) devices for relaying signals in a self-organizing network and a field device for originating output signals. The sensor is configured to transmit the output signals to at least one of the SON devices, and the SON devices do not originate signals but only relay signals originated externally. At least one of the SON devices is self-powered by harvesting energy from an adjacent energy source.

16 Claims, 2 Drawing Sheets

OTHER PUBLICATIONS

Patnode, D., et al., "Wireless Sensor Network (AKA WISENET)-Functional Description," Oct. 30, 2002.

Schmid, A.J., "Overview of the Application of Piezoceramics Bending Actuators—Piezoceramics at Argillon" from 1st International Workshop on Smart Materials and Structures, Oct. 2004.

Schneider, A., "Batteryless Radio Technology," from Wireless M2M Congress, Jun. 2005.

Schmidt, F., et al., "Wireless Sensors Enabled by Smart Energy—Concepts and Solutions" (Publication Date Unknown).

Sierra, G., et al., "Wireless as a hot topic—Process and Asset Management See Wireless Innovation Through New Lens," In Tech Magazine, Sep. 1, 2005, available at www.isa.org.

Dunne, J., "WISENET—Wireless Sensor Network" (Publication Date Unknown).

Katz, A., "Residential Piezoelectric Energy Sources," Jul. 21, 2004.

University of Paderborn, "Project—Energy Harvesting," from wwwhni.uni.-paderborn.de/projekte/projekt_e.php3?id=345 (last visited Jul. 16, 2005).

Thompson, V., et al., "Enocean Proffers Piezo Power So Low-Energy Products See the Light," from Small Times: News about MEMS, Nanotechnology and Microsystem, Mar. 24, 2003, available at www.smalltimes.com/document_display.cfm?document_id=5708.

Bay Tech Venture Capital, "Enocean," available at www.en.w2.baytechventurecapital.de/portfolio/enocean.html (last visited Jul. 16, 2005).

Enocean, "Application Overview for EnOcean Technology," available at www.enocean.de/contente21a.htm (last visited Jul. 16, 2005).

MicroStrain, Inc. website, located at www.microstrain.com (last visited Jul. 17, 2005).

* cited by examiner

SELF POWERED SON DEVICE NETWORK

BACKGROUND OF THE INVENTION

The present invention relates to signal transmission systems, and more particularly, to networks having a self-powered device for relaying signals.

Self-organizing networks are wireless signal transmission networks that enable single-hop and multi-hop transmission of signals between points in the network. The term "motes" denotes relays that are capable of wirelessly receiving and transmitting signals in the self-organizing network. Motes and similar devices can be communicably linked to sensors and other types of signal generating and receiving components. These self-organizing networks enable flexible transmission of signals, and can be used in process facilities and other plant settings to relay data between desired locations. This data can be collected by one or more sensors and transmitted via the network to one or more data collection and/or data processing locations.

Networks of motes or similar devices provide numerous advantages with regard to the installation of signal transmission networks by reducing the amount of wiring required to establish such a network. The cost savings in reducing time- and skill-intensive installation tasks can be significant. By eliminating the need for signal transfer across communication wires, the wireless relay capabilities of network devices can be particularly advantageous in locations where access for making wired communication line connections is limited. However, providing a power supply to such network devices can still be difficult. In locations where hard wiring is difficult, network devices generally cannot be connected to an electrical grid in a conventional manner. Even where conventional electrical grid connection can be made, the wiring required to make such a connection is labor-intensive and may be undesirably costly. Moreover, on-board energy storage in the form of batteries, fuels, etc. provides only a finite energy supply, and the replacement of batteries and the replenishment of fuels, etc. is inconvenient. Yet, operation of a wireless self-organizing network depends on providing an adequate power supply to the network devices.

The present invention provides a self-powered device network with self-organizing network devices capable of harvesting energy from an adjacent energy source to provide power.

BRIEF SUMMARY OF THE INVENTION

A network according to the present invention includes a plurality of wirelessly interconnected self-organizing network (SON) devices for relaying signals in a self-organizing network and a field device for originating output signals. The sensor is configured to transmit the output signals to at least one of the SON devices, and the SON devices do not originate signals but only relay signals originated externally. At least one of the SON devices is self-powered by harvesting energy from an adjacent energy source.

DETAILED DESCRIPTION

The present invention provides a wireless self-organizing network made up of one or more self-organizing network devices (hereinafter, "SON devices") that are self-powered by harvesting energy from an adjacent energy source. The term "self-organizing network" as used herein refers to a communications signal relaying system that enables passive relaying of signals between two external nodes communicably connected to the self-organizing network. A self-organizing network can have a mesh, star, cluster, or other type of topology. "SON devices" are devices that passively relay signals within a network, and, as that term is used herein, SON devices are distinguishable from field devices that generate signals (e.g., sensors) and collect signals (e.g., data collection and data processing devices). According to the present invention, installation of the wireless self-organizing network is simplified by utilizing available energy sources to generate electrical energy to power those SON devices. For example, such a self-organizing network is advantageous for use in processing and manufacturing facilities. The SON devices forming the self-organizing network can be powered by harvesting energy available at an installation location for each SON device within a particular facility, which eliminates the need to supply power to those locations through wiring or through the replacement of batteries, etc. The potential cost savings with the present invention are substantial.

Figure 1A:
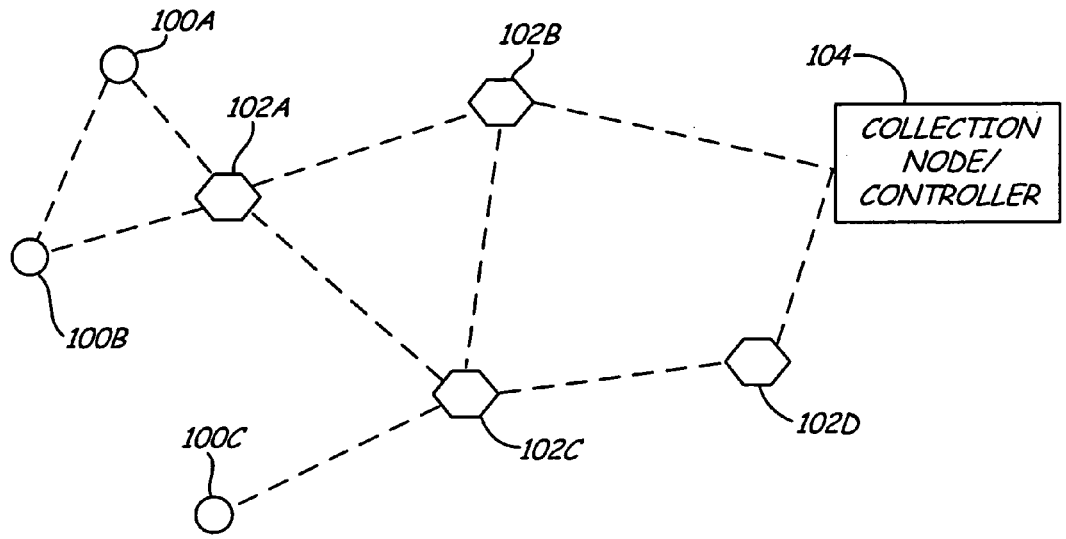
FIG. 1A is a schematic illustration of a wireless communication network according to the present invention.
Figure 1B:
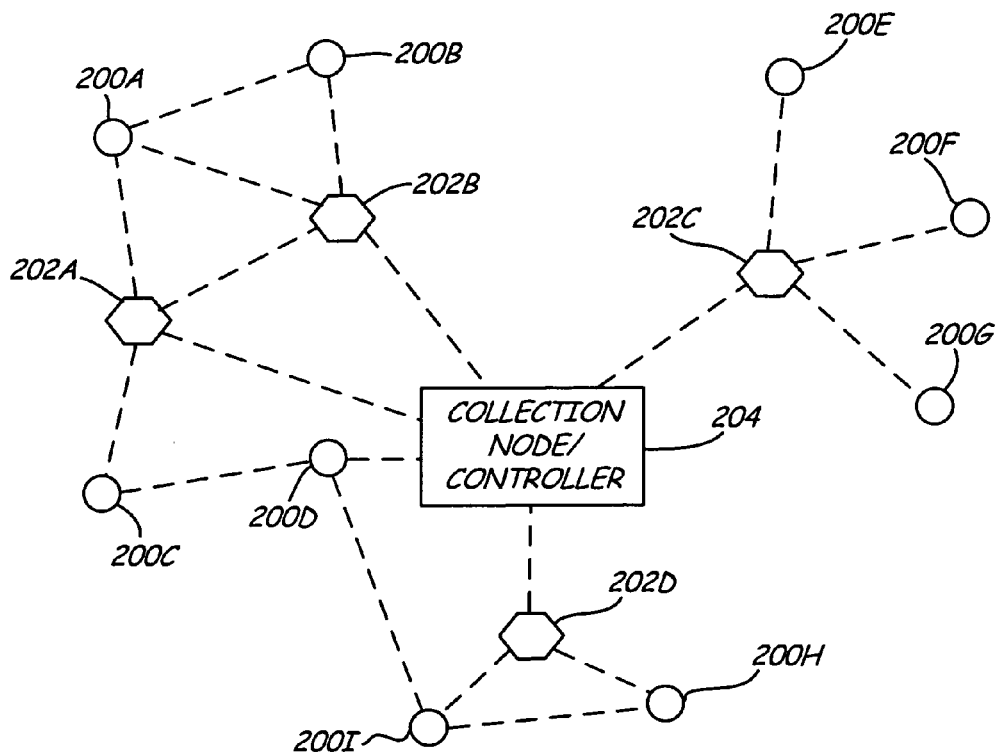
FIG. 1B is a schematic illustration of an alternative embodiment of a wireless communication network.

FIGS. 1A and 1B illustrate two embodiments of wireless communications networks, showing alternative configurations. The number of possible alternative configurations for such communications networks is limitless, and those shown in FIGS. 1A and 1B are provided merely as examples. The wireless communications network shown in FIG. 1A includes a number of field devices 100A-100C (collectively, field devices 100), a number of SON devices 102A-102D (collectively, SON devices 102), and a collection node/controller 104. The field devices 100A-100C, SON devices 102A-102D and the collection node/controller 104 can each be considered "nodes" of the network. Possible wireless signal transmission paths between nodes are shown as dashed lines.

The field devices 100 originate data signals, which are transmitted through the network to the collection node/controller 104. Each of the field devices 100 can be any type of field device, such as a process sensor, process actuator, process control module, process alarm module, process diagnostic module, etc. Generally, the field devices 100 are wireless communication enabled devices of the types commonly used in process control and measurement applications within processing and manufacturing facilities. For example, the field devices 100 can be pressure sensors (e.g., 3051S series pressure sensors available from Emerson Process Management, Chanhassen, Minn.), temperature sensors (e.g., 648 series temperature sensors available from Emerson Process Management), vibration sensors, flow sensors, etc. The field devices 100A-100C can each be of a different type, or one or all of the devices 100A-100C can be of the same type. In one embodiment, the field devices 100 can be self-powered in a manner similar to that described below with respect to SON devices.

The SON devices 102 act like "repeaters" and collectively form a self-organizing network to passively relay signals within the network. The SON devices 102 can have any suitable configuration. The signals are originally generated by network components other than the SON devices 102 (e.g., by the field devices 100), and the SON devices 102 merely pass along and retransmit those signals to other nodes in the network. The organization and operation of self-organizing networks are known in the art. For example, "Wireless As a Hot Topic: Process and Asset Management See Wireless Innovation Through New Lens" by G. Sierra and B. Karschnia, *In Tech Magazine, Sep.* 1, 2005, which is hereby incorporated by reference in its entirety, explains the configuration and operation of typical self-organizing networks. In being self-organizing, the particular communication paths of the network between an originating node, which originally generates a signal, and a destination node, which ultimately receives that signal, need not be predetermined.

The collection node/controller 104 includes a communications transceiver and can include other commercially available software and hardware as desired. The collection node/controller 104 receives data signals originally generated by the field devices 100, and can store and/or process data contained in those signals. In addition, the collection node/controller 104 can generate control signals that can be used to control the operation of field devices connected to the network. One example of a control signal would be a command sent to a sensor to initiate a self-diagnostic routine. Typically, the network will include only one node for data collection, as shown in FIG. 1A, although that node can comprise a number of discrete devices that work in conjunction to collect and process data and control operation of the network.

The number and arrangement of the nodes in the network is influenced by a number of factors. The locations of the field devices 100 is typically driven by a desire to obtain particular data from particular locations, or to otherwise interface with particular process locations within a facility. The location of the collection node/controller 104 can be a centralized location, or a location that facilitates data collection and processing. The number and location of the SON devices 102 can vary greatly. Because the network is often deployed in settings where facility infrastructure and sources of interference can impede wireless communication between nodes, the self-organizing network established by the SON devices 102 is configured to maintain robust and reliable communication. For instance, networks using radio frequency wireless communication have limits on signal transmission ranges. Radio frequency transmission is affected by walls, pipes and other structures that obstruct line-of-sight signal transmission. Moreover, the transmission range will be affected by the particular radio frequency band utilized, and the effects of undesired interference on that frequency band. In addition, SON device location can be influenced by installation and maintenance concerns, because it is desirable to install the SON devices 102 at locations that are relatively easily accessible. All these factors influence SON device installation location selection, as well as the number of SON devices included in the network.

In general, the SON devices 102 can provide flexibility to the network by forming a number of possible communication paths, which can be utilized as needed by the network on any particular occasion. An example of this type of operation can be explained as follows. A signal can be originally generated by the first field device 100A for ultimate delivery to the collection node/controller 104. The signal is first transmitted to the first SON device 102A. The shortest path to the collection node/controller 104 from the first SON device 102A is via the second SON device 102B. However, an alternative path would involve transmission of the signal from the first SON device 102A to the third SON device 102C, then the fourth SON device 102D, and finally to the collection node/controller 104. Such an alternative path might be utilized when the shorter path is temporarily unavailable due to signal interference.

It should be understood that the particular number and arrangement of the SON devices 102 in the network will vary depending on the particular application. Generally, the inclusion of more SON devices and the spacing of adjacent SON devices at shorter distances will increase network reliability by increasing the number of possible transmission paths. However, the inclusion of relatively large numbers of SON devices to provide alternative or redundant signal transmission paths is merely optional.

The wireless communications network shown in FIG. 1B includes a number of field devices 200A-200I, a number of SON devices 202A-202D, and a collection node/controller 204. The network of FIG. 1A is generally similar to the network shown and described with respect to FIG. 1B, with an alternative arrangement of nodes. The network in FIG. 1B illustrates how a network can transmit signals from a field device to a collection node/controller in a single hop (field device 200D to collection node/controller 204) or in a multi-hop fashion (e.g., field device 200A to SON device 202A to SON device 202B to collection node/controller 204).

Figure 2:
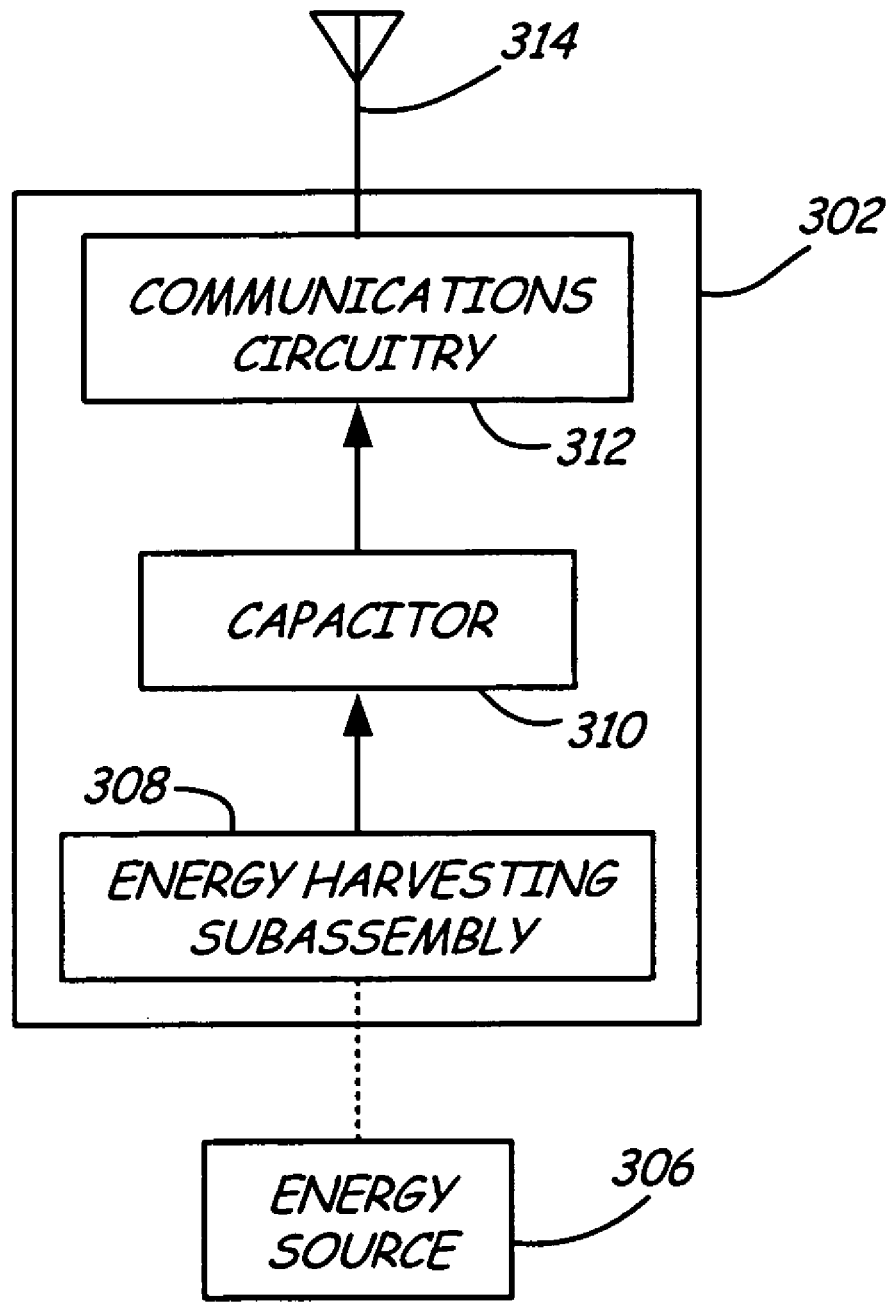
FIG. 2 is a block diagram of a self-powered self-organizing network device and an energy source.

FIG. 2 is a block diagram of an exemplary embodiment of a self-powered SON device 302 and an energy source 306 located adjacent to the SON device 302. The SON device 302 includes an energy harvesting subassembly 308, a capacitor 310, communications circuitry 312, and an antenna 314.

The communications circuitry 312 is operably connected to the antenna 314, and enables two-way wireless communication. The communications circuitry 312 can include volatile or non-volatile memory, and other sub-components (not shown) suitable for enabling two-way wireless communication. Using the communications circuitry 312 and the antenna 314, the SON device 302 is able to communicate within a self-organizing network, such as those shown and described with respect to FIGS. 1A and 1B, to relay signals. The particular configuration of the communications circuitry 312 can vary. For instance, the frequency of signal relay transmission can vary. The SON device 302 can operate within a self-organizing network at fixed intervals, such as sending communication signal relay "bursts" at ten minute intervals. The SON device 302 can alternatively relay transmissions on a continuous basis. In a further alternative configuration, the SON device 302 can communicate in an on-event manner, where communication signal relay bursts are initiated by a particular event that triggers communication within a self-organizing network. Furthermore, the particular frequency band at which signals are transmitted (i.e., relayed) in the self-organizing network can vary. The frequency band selected will affect signal transmission in a facility setting, and the particular transmission frequency used is typically selected as a function of parameters such as the distance between adjacent, communicably-linked SON devices and the potential risks of signal interference. Suitable signal transmission frequencies include the industrial, scientific and medical (ISM) radio frequency bands at about 900 MHz and about 2.4 GHz.

In a typical embodiment, the communications circuitry 312 draws about 250 microamps ($\mu$A) at about 3 volts (V), which means that about one milliwatt (mW) of power must be supplied to operate the communications circuitry. However, the particular power requirements of the communications circuitry 312 will vary according to the particular application. For instance, the power requirements for sending communication signal relay bursts may be greater than power requirements during other operating periods.

The energy harvesting subassembly 308 enables the harvesting of energy from the energy source 306 to produce electrical power. The electrical energy produced is sent to and stored in the capacitor 310. From the capacitor 310, power can be supplied to the communications circuitry 312. It should be understood that the block diagram shown in FIG. 2 is a simplified illustration, and the SON device 302 may include additional components not specifically shown. For instance, a voltage multiplier or other components may be included to convert electrical energy generated by the energy harvesting subassembly 308 into a form suitable for storage in the capacitor 310 and for use by the communications circuitry 312.

The capacitor 310 can be any suitable type of capacitor, and can facilitate the provision of a substantially continuous power supply from the energy harvesting subassembly 308 as well as long-term energy storage. In some embodiments, the electrical power produced by the energy harvesting subassembly 308 may fluctuate over time, making it desirable for the capacitor 310 to provide relatively long-term power storage to mitigate the effects of any fluctuations in power generation. In one embodiment, the capacitor 310 can be a rechargeable electrolytic capacitor to provide a substantially constant available power supply. In an alternative embodiment, a rechargeable battery can be provided instead of a rechargeable electrolytic capacitor.

It should be understood that the capacitor 310 is shown in FIG. 2 by way of example and not by way of limitation. In further alternative embodiments, other electrical elements can be utilized with SON device 302, for instance, transformers, inductors, DC/DC converters, etc. It should also be noted that any type of energy storage device can be used instead of or in addition to the capacitor 310. Moreover, direct wire connections without capacitor 310 are also contemplated by the present invention.

The adjacent energy source 306 can provide energy in a variety of forms, for example, kinetic energy, thermal energy, electromagnetic energy, and light or solar energy. The adjacent energy source 306 can be classified as providing ambient energy, existing utility energy, waste energy, etc. Typically, the adjacent energy source 306 will be a pre-existing source that is readily available at a desired SON device installation location. Examples of pre-existing energy source locations include steam supply pipes, compressed fluid (e.g., compressed air) systems, liquid or gaseous nitrogen supply systems, power supply systems (e.g., electrical conduit housing live wires), hot/cold fluid supply systems, fluid flows, and so forth.

The self-powered SON device 302 is able to harvest available energy, which can reduce installation cost by eliminating the need to route power supply wiring to the installation location from an electrical grid and can reduce maintenance requirements by avoiding the need to replace batteries that have depleted finite stored charges. Moreover, in many situations, the energy harvested from the adjacent energy source 306 is waste energy, which is to say energy that otherwise would not be utilized. Self-powered SON devices that utilize waste energy can help reduce overall facility power consumption by avoiding the need to provide additional energy to power the SON devices. It should also be noted that locations of energy sources are factors that can greatly influence the selection of SON device installation locations. Because of the great flexibility of self-organizing networks, SON devices in the network can be installed in a manner that most efficiently utilizes available energy sources to power the SON devices while still providing adequate signal relaying capabilities between available self-organizing network nodes.

The energy harvesting subassembly 308 can take a variety of forms, and the particular configuration of the energy harvesting subassembly is selected according to the characteristics of the adjacent energy source 306. In some situations, multiple types of suitable energy sources may be available. The energy harvesting subassembly 308 can be selected and configured to use one or more of the available energy sources as desired. Typically, a single energy source (i.e., the adjacent energy source 306) is selected.

Known energy harvesting devices can be used with the present invention, in order to function as the energy harvesting subassembly 308. Examples of suitable energy harvesting devices are disclosed in U.S. patent application Ser. No. 10/745,310 by Schumacher et al, entitled "Pressurized Gas to Electrical Energy Conversion for Low-Power Field Devices," and U.S. patent application Ser. No. 11/238,181 by Anderson et al., entitled "Steam Trap Monitoring," which are both hereby incorporated by reference in their entireties. Well-known energy harvesting devices such as solar cells and piezoelectric generators can also be utilized. It should be recognized that these types of energy harvesting subassemblies are provided merely as examples, and further types of subassemblies can be utilized. The particular type of energy harvesting subassembly used will depend on the particular energy source(s) selected.

The energy harvesting subassembly 308 can be integrated with standard "utility type parts", which are components typically used in a facility's utility systems. In other words, the SON device 302 can be combined with or attached to a component for another system, which means that installation of the utility type part simultaneously installs the SON device 302 without any additional effort to install communication lines or power supply lines to the SON device 302. The following are some examples. Where the energy source 306 is a steam system, the energy harvesting subassembly 308 can be integrated with a steamtrap, a valve, a pipe segment or a filter in order to harvest thermal or kinetic energy from the steam. For a gas supply system, like compressed air or nitrogen supply systems, the energy harvesting subassembly 308 can be integrated with a regulator, pipe segment or filter to harvest kinetic energy or thermal energy. For liquid flow systems, the energy harvesting subassembly 308 can be configured as part of a valve, hose segment, pipe segment, or flange to harvest kinetic energy. For hot/cold fluid systems, the energy harvesting subassembly 308 can be integrated with a valve, hose segment, pipe segment, or flange to harvest thermal energy. For power systems, the energy harvesting subassembly 308 can be integrated with a light fixture, a junction box, a conduit segment, a push button, or a display (e.g., an LCD).

It should be recognized that the present invention provides numerous advantages and benefits, which have particular value to the process control and measurement industry. The use of self-powered SON devices according to the present invention can greatly reduce the amount of labor required to install and maintain a self-organizing network, which can directly reduce the set-up and operational cost of such a network. This is advantageous during set-up of a new facility, as well as for providing a communications network for an existing facility. Moreover, self-powered SON devices can utilize waste energy or other types of readily available energy sources, which makes the system energy efficient.

Although the present invention has been described with reference to preferred embodiments, workers skilled in the art will recognize that changes may be made in form and detail without departing from the spirit and scope of the invention. For instance, nearly any type of energy harvesting scheme can be used to self-power SON devices in the self-organizing network. Self-powered SON devices can also be utilized with existing networks of conventionally-powered SON devices. Moreover, nearly any type of self-organizing network configuration can be utilized. In addition, although wireless networks using radio frequency communication signals have been described, the present invention can utilize any form of wireless signal transmission, such as infrared signal transmission, etc.

The invention claimed is:

1. A network comprising:
   at least one signal-originating self-organizing network device;
   a plurality of wirelessly interconnected self-organizing network devices for relaying signals originated by the at least one signal-originating self-organizing network device in a self-organizing network, wherein at least one of the self-organizing network devices is self-powered by harvesting energy from an adjacent energy source that comprises waste energy from process operations at an industrial process facility, wherein the adjacent energy source comprises a nitrogen supply system, and wherein the self-organizing network devices do not originate signals but only relay signals originated externally; and
   a field device located in the industrial process facility for originating process control output signals, wherein the field device is configured to transmit the process control output signals to at least one of the self-organizing network devices.

2. The network of claim 1 and further comprising:
   a collection node transceiver capable of wirelessly receiving signals transmitted by at least one of the self-organizing network devices.

3. The network of claim 2 and further comprising:
   a control system operably connected to the collection node transceiver for controlling operation of the field device using control signals relayed by at least one of the self-organizing network devices.

4. The network of claim 1, wherein the field device is a process sensor.

5. The network of claim 1, wherein the field device comprises a process actuator.

6. A network comprising:
   at least one signal-originating self-organizing network device;
   a plurality of wirelessly interconnected self-organizing network devices for relaying signals originated by the at least one signal-originating self-organizing network device in a self-organizing network, wherein at least one of the self-organizing network devices is self-powered by harvesting energy from an adjacent energy source that comprises waste energy from process operations at an industrial process facility, wherein the adjacent energy source comprises a power supply conduit system, and wherein the self-organizing network devices do not originate signals but only relay signals originated externally; and
   a field device located in the industrial process facility for originating process control output signals, wherein the field device is configured to transmit the process control output signals to at least one of the self-organizing network devices.

7. A network comprising:
   a signal source for generating a process control output signal in an industrial process plant;
   a collection node for receiving the process control output signal; and
   one or more self-organizing network devices defining a wireless self-organizing network between the signal source and the collection node for relaying the process control output signal therebetween, wherein at least one of the self-organizing network devices is capable of harvesting electromagnetic or thermal energy from an energy source located in the industrial process plant to produce electrical power, and wherein the energy source comprises a nitrogen supply system is associated with an industrial process.

8. The network of claim 7, wherein the signal source is a process sensor.

9. The network of claim 7 and further comprising:
   a control system operably connected to the collection node for controlling operation of the field device by control signals relayed by at least one of the self-organizing network devices, wherein the collection node is capable of receiving and transmitting signals.

10. The network of claim 7, wherein a plurality of self-organizing network devices define the wireless self-organizing network, and wherein each self-organizing network device is capable of harvesting energy from the energy source located in the industrial process plant to produce electrical power.

11. The network of claim 7, wherein at least one of the self-organizing network devices is powered solely by harvesting energy.

12. The network of claim 7, wherein the field device comprises a process actuator.

13. A method of signal transmission comprising:
   generating a process control signal in an industrial process facility;
   wirelessly transmitting the process control signal to a self-organizing network established by one or more self-organizing network devices;
   harvesting energy from one of a nitrogen supply system and a power supply conduit system in the industrial process facility to provide power to at least one of the self-organizing network devices, wherein the harvested energy is derived from waste energy from industrial process facility manufacturing operations; and
   relaying the process control signal through at least one of the self-organizing network devices in the self-organizing network to a collection node.

14. The method of claim 13, wherein the step of relaying the process control signal through the self-organizing network to a collection node involves multi-hop transmission of the signal by a plurality of self-organizing network devices.

15. The method of claim 13, wherein the self-organizing network is entirely powered by harvested energy collected in the industrial process facility.

16. A network comprising:
a signal source for generating a process control output signal in an industrial process plant;
a collection node for receiving the process control output signal; and
one or more self-organizing network devices defining a wireless self-organizing network between the signal source and the collection node for relaying the process control output signal therebetween, wherein at least one of the self-organizing network devices is capable of harvesting electromagnetic energy from an energy source located in the industrial process plant to produce electrical power, and wherein the energy source comprises a power supply conduit system associated with an industrial process.

* * * * *